(12) United States Patent
Gentsch

(10) Patent No.: US 9,583,937 B2
(45) Date of Patent: Feb. 28, 2017

(54) LOW-, MEDIUM-, OR HIGH-VOLTAGE SWITCHGEAR

(71) Applicant: ABB Technology AG, Zürich (CH)

(72) Inventor: Dietmar Gentsch, Ratingen (DE)

(73) Assignee: ABB Schweiz AG, Baden (CH)

( * ) Notice: Subject to any disclaimer, the term of this patent is extended or adjusted under 35 U.S.C. 154(b) by 176 days.

(21) Appl. No.: 14/311,681

(22) Filed: Jun. 23, 2014

(65) Prior Publication Data

US 2014/0301004 A1    Oct. 9, 2014

Related U.S. Application Data

(63) Continuation of application No. PCT/EP2012/005229, filed on Dec. 18, 2012.

(30) Foreign Application Priority Data

Dec. 23, 2011 (EP) ..................... 11010183

(51) Int. Cl.

| H01H 9/30 | (2006.01) |
|---|---|
| H02H 9/00 | (2006.01) |
| H02H 7/22 | (2006.01) |
| H02H 3/08 | (2006.01) |
| H02H 9/02 | (2006.01) |
| H01H 9/42 | (2006.01) |
| H01H 9/54 | (2006.01) |

(52) U.S. Cl.
CPC ............ *H02H 9/002* (2013.01); *H02H 7/222* (2013.01); *H01H 9/42* (2013.01); *H01H 9/548* (2013.01); *H02H 3/08* (2013.01); *H02H 9/005* (2013.01); *H02H 9/026* (2013.01)

(58) Field of Classification Search
USPC .............................. 361/2, 9, 10, 12
See application file for complete search history.

(56) References Cited

U.S. PATENT DOCUMENTS

| 6,072,673 | A | * | 6/2000 | Chen .................... H01H 33/123 361/13 |
|---|---|---|---|---|
| 2006/0002046 | A1 | * | 1/2006 | Francis .................... H01C 7/12 361/103 |
| 2010/0165532 | A1 | | 7/2010 | Park et al. |
| 2011/0177953 | A1 | | 7/2011 | Llambes et al. |

OTHER PUBLICATIONS

International Search Report (PCT/ISA/210) mailed on May 14, 2013, by the European Patent Office as the International Searching Authority for International Application No. PCT/EP2012/005229.

(Continued)

*Primary Examiner* — Danny Nguyen
(74) *Attorney, Agent, or Firm* — Taft Stettinius & Hollister LLP

(57) ABSTRACT

A low-, medium-, or high-voltage voltage switchgear with a circuit breaker or circuit breakers is disclosed which can switch electrical equipment. To protect the switchgear, and the circuit breakers in the switchgear against so called spot welding under vacuum atmosphere, such as during a closing operation of a switchgear used, for example, for switching capacitive or inductive equipment or inductive or capacitive current network an inrush current limiter is placed electrically in line or in series with the current path of the circuit breaker.

10 Claims, 1 Drawing Sheet

(56) References Cited

OTHER PUBLICATIONS

Written Opinion (PCT/ISA/237) mailed on May 14, 2013, by the European Patent Office as the International Searching Authority for International Application No. PCT/EP2012/005229.
Search Report mailed on Aug. 13, 2012, by the European Patent Office for Application No. 11010183.9.

\* cited by examiner

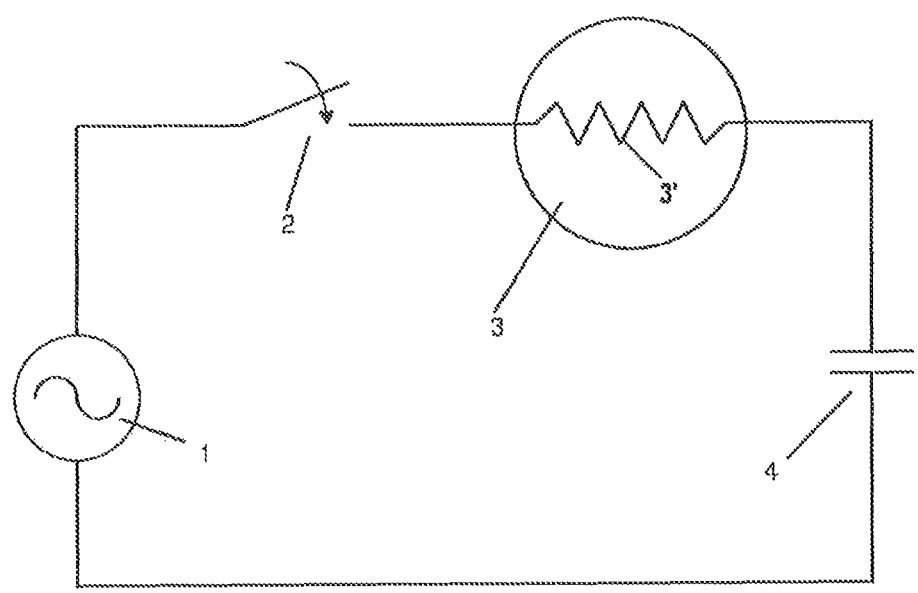

LOW-, MEDIUM-, OR HIGH-VOLTAGE SWITCHGEAR

RELATED APPLICATION

This application claims priority as a continuation application under 35 U.S.C. §120 to PCT/EP2012/005229, which was filed as an International Application on Dec. 18, 2012 designating the U.S., and which claims priority to European Application 11010183.9 filed in Europe on Dec. 23, 2011. The entire contents of these applications are hereby incorporated by reference in their entireties.

FIELD

The present disclosure relates to a switchgear, such as low-, medium-, or high-voltage switchgear.

BACKGROUND INFORMATION

A vacuum circuit breaker can be equipped with mainly one single vacuum interrupter to perform close and open operations. In an exemplary specific case, an inrush current of 5 kA at nearly 400 Hz or 20 kA at nearly 4300 Hz in case of back to back switching can have an influence during closing of the contacts at a rated voltage. At first, before the contacts are closed, it develops a pre-arc short before both contacts touch each other, and during the closing stage it can cause a so called "spot welding" with pre-arcing under vacuum atmosphere. During a number of opening operations, the contacts will be damaged more and more, and material will be transferred between the contacts and microtips are developed which can decrease voltage strength especially in a gap between the contacts.

SUMMARY

A low-, medium-, or high-voltage switchgear, for switching capacitive or inductive equipment or an inductive or capacitive current network, the switchgear comprising: a circuit breaker or circuit breakers for switching electrical equipment; and an inrush current limiter electrically in line or in series with a current path of the circuit breaker

BRIEF DESCRIPTION OF THE DRAWINGS

Features disclosed herein will be discussed in greater detail with reference to an exemplary embodiment as illustrated in the drawing, wherein:

FIG. 1 shows an exemplary circuit diagram of a location of a circuit limiter.

DETAILED DESCRIPTION

Protection of a switchgear, such as circuit breakers in the switchgear, against the so called "spot welding" under high inrush current load with pre-arcing is disclosed, such as can occur during a closing operation.

In an exemplary switchgear used for switching capacitive or inductive equipment or inductive or capacitive current networks, an inrush current limiter is placed electrically in line or in series with a current path of the circuit breaker. By this, the current is automatically limited during a switching (closing operation) process, in order to protect the contacts from strong spot welding, in a very effective way.

Exemplary embodiments can thus reduce the "spot welding strength" during the closing operation by applying an inrush current limiting system. The inrush current limiter can absorb high amounts of inrush current when electrical equipment is turned on, by offering a high resistance to current and quickly decreasing in resistance once steady state current begins to flow through a thermistor. During the absorption of energy, the initial high resistance of the thermistor drops within milliseconds to a negligible resistance.

The "spot welding" under vacuum can be reduced to a certain limit which provides low damage or contact material transfer with the related occurrence of microtips at the contact surface.

In an exemplary further embodiment the inrush current limiter is connected in line between the circuit breaker (here especially with the vacuum interrupter) and the capacitive or inductive equipment which will be switched on or off; this can be most effective.

The inrush current limiter can for example be a semiconductor element, which itself can increase its electrical resistance during current increase.

In an exemplary embodiment, an increase current limiter is arranged for each electrical phase to provide, for example, single phase and three phase applications.

For practical, compact and safe integration, the current limiter or the current limiters can be integrated into the switchgear, or a housing of the switchgear.

FIG. 1 shows a circuit diagram of the location of the circuit limiter.

In FIG. 1, an inrush current limiter 3 is connected in series to a current path of circuit contacts 2, and arranged on a side between a circuit breaker and electrical equipment 4, which can have a capacitive or inductive property.

To reduce the "spot welding" during the closing operation, an inrush current limiting system is provided. The inrush current limiter can absorb high amounts of inrush current (e.g., sufficient to protect against currents which could damage the electrical equipment) when electrical equipment is turned on, by offering a specified (e.g., high) resistance to current and quickly decreasing in resistance once a steady state current begins to flow through the thermistor. During the absorption of energy, an initial high resistance of the thermistor 3' will drop (e.g., within milliseconds) to a negligible (e.g., near zero) resistance.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A low-, medium-, or high-voltage switchgear, for switching a capacitive or an inductive equipment or an inductive or a capacitive current network circuit, the switchgear comprising:
   a circuit breaker or circuit breakers for switching the electrical equipment or the circuit network; and
   an inrush current limiter electrically in series with a current path of the circuit breaker so that the inrush current limiter absorbs a high amount of inrush current when the electrical equipment is turned on by offering a high resistance to the inrush current and quickly decreasing in resistance once a steady current begins to flow through a thermistor.

2. The low-, medium-, or high-voltage switchgear according to claim 1, in combination with the capacitive or the inductive equipment which will be switched on or off, wherein the inrush current limiter is connected between the circuit breaker and the capacitive or inductive equipment.

3. The low-, medium-, or high-voltage switchgear according to claim 1, wherein the inrush current limiter is a semiconductor element, which will increase in electrical resistance during a current increase.

4. The low-, medium-, or high-voltage switchgear according to claim 1, wherein the inrush increase current limiter is arranged for each of plural electrical phases.

5. The low-, medium-, or high-voltage switchgear according to claim 1, wherein the inrush current limiter is, at least in part, a semiconductor current limiter.

6. The low-, medium-, or high-voltage switchgear according to claim 1, wherein the inrush current limiter is integrated into the switchgear, or a housing of the switchgear.

7. The low-, medium-, or high-voltage switchgear according to claim 2, wherein the inrush current limiter is a semiconductor element, which will increase in electrical resistance during a current increase.

8. The low-, medium-, or high-voltage switchgear according to claim 7, wherein the inrush increase current limiter is arranged for each of plural electrical phases.

9. The low-, medium-, or high-voltage switchgear according to claim 8, wherein the inrush current limiter is, at least in part, a semiconductor current limiter.

10. The low-, medium-, or high-voltage switchgear according to claim 9, wherein the inrush current limiter is integrated into the switchgear, or a housing of the switchgear.

* * * * *